United States Patent
Ning (10) Patent No.: US 11,573,646 B2
(45) Date of Patent: Feb. 7, 2023

(54) METHOD AND SYSTEM FOR RANKING CANDIDATES IN INPUT METHOD

(71) Applicant: Beijing Xinmei Hutong Technology Co., Ltd., Beijing (CN)

(72) Inventor: Yafeng Ning, Beijing (CN)

(73) Assignee: BEIJING XINMEI HUTONG TECHNOLOGY CO., LTD, Beijing (CN)

( * ) Notice: Subject to any disclaimer, the term of this patent is extended or adjusted under 35 U.S.C. 154(b) by 5 days.

(21) Appl. No.: 15/695,707

(22) Filed: Sep. 5, 2017

(65) Prior Publication Data
US 2018/0067919 A1     Mar. 8, 2018

(30) Foreign Application Priority Data

Sep. 7, 2016     (CN) .......................... 201610809488.1

(51) Int. Cl.
| | |
|---|---|
| G06F 3/023 | (2006.01) |
| G06F 40/274 | (2020.01) |
| G06F 3/04883 | (2022.01) |
| G06F 3/04886 | (2022.01) |
| G06F 3/042 | (2006.01) |

(52) U.S. Cl.
CPC .......... G06F 3/0237 (2013.01); G06F 3/0236 (2013.01); G06F 3/0426 (2013.01); G06F 3/04883 (2013.01); G06F 3/04886 (2013.01); G06F 40/274 (2020.01)

(58) Field of Classification Search
CPC .. G06F 17/276; G06F 3/0237; G06F 3/04883; G06F 3/04886
USPC ........................................................ 715/773
See application file for complete search history.

(56) References Cited

U.S. PATENT DOCUMENTS

| | | | |
|---|---|---|---|
| 6,259,436 B1 * | 7/2001 | Moon ................... | G06F 3/0488 715/810 |
| 7,957,955 B2 * | 6/2011 | Christie ................ | G06F 3/0237 704/9 |
| 8,117,540 B2 * | 2/2012 | Assadollahi ........ | G06F 3/04892 715/256 |
| 8,179,370 B1 * | 5/2012 | Yamasani ............. | G06F 3/0237 345/169 |

(Continued)

FOREIGN PATENT DOCUMENTS

CN         103699233 B  *  4/2019

*Primary Examiner* — Sherief Badawi
*Assistant Examiner* — Koorosh Nehchiri
(74) *Attorney, Agent, or Firm* — Anova Law Group, PLLC (57) ABSTRACT

A method and a system for ranking candidates in an input method are provided. The method comprises: receiving an initial key code string inputted by a user using an input method; for each character in the initial key code string, obtaining a weight of the character and weights of characters surrounding the character, and establishing a key code string weight list with a corresponding hierarchy according to a character input order. The method further comprises: when character combinations are obtained from a dictionary, according to a correspondence relationship between a hierarchy in the input method dictionary and the hierarchy in the key code string weight list, determining weights of the character combinations using the key code string weight list; and based on the weights of the character combinations, ranking candidates corresponding to the character combinations.

8 Claims, 5 Drawing Sheets

(56) References Cited

U.S. PATENT DOCUMENTS

| | | | | |
|---|---|---|---|---|
| 8,516,367 B2* | 8/2013 | Archer | G06F 40/274 | |
| | | | 715/257 | |
| 8,782,556 B2* | 7/2014 | Badger | G06F 40/166 | |
| | | | 715/816 | |
| 9,081,482 B1* | 7/2015 | Zhai | G06F 3/0237 | |
| 9,659,002 B2* | 5/2017 | Medlock | G06F 3/0237 | |
| 10,809,914 B2* | 10/2020 | Clements | G06F 3/04842 | |
| 2004/0140956 A1* | 7/2004 | Kushler | G06F 3/04883 | |
| | | | 345/168 | |
| 2006/0088356 A1* | 4/2006 | Jawerth | G06F 1/162 | |
| | | | 400/472 | |
| 2007/0040813 A1* | 2/2007 | Kushler | G06F 3/0237 | |
| | | | 345/173 | |
| 2008/0154576 A1* | 6/2008 | Wu | G06F 3/018 | |
| | | | 704/2 | |
| 2008/0270896 A1* | 10/2008 | Kristensson | G06F 3/0237 | |
| | | | 715/261 | |
| 2009/0193334 A1* | 7/2009 | Assadollahi | G06F 40/274 | |
| | | | 707/999.005 | |
| 2010/0036655 A1* | 2/2010 | Cecil | G06F 3/0237 | |
| | | | 704/10 | |
| 2010/0171700 A1* | 7/2010 | Sharan | G06F 3/0237 | |
| | | | 345/161 | |
| 2010/0315266 A1* | 12/2010 | Gunawardana | G06F 3/0237 | |
| | | | 341/22 | |
| 2012/0223889 A1* | 9/2012 | Medlock | G06F 3/04883 | |
| | | | 345/168 | |
| 2012/0254197 A1* | 10/2012 | Kuzmin | G06F 3/04883 | |
| | | | 707/751 | |
| 2013/0046544 A1* | 2/2013 | Kay | G06F 3/04883 | |
| | | | 704/275 | |
| 2013/0227460 A1* | 8/2013 | Jawerth | G06F 3/04886 | |
| | | | 715/773 | |
| 2013/0314352 A1* | 11/2013 | Zhai | G06F 3/04883 | |
| | | | 345/173 | |
| 2013/0339895 A1* | 12/2013 | Hirshberg | G06F 3/04886 | |
| | | | 715/773 | |
| 2014/0058725 A1* | 2/2014 | Longe | G06F 3/02 | |
| | | | 704/9 | |
| 2014/0237356 A1* | 8/2014 | Durga | G06F 3/0236 | |
| | | | 715/256 | |
| 2014/0351741 A1* | 11/2014 | Medlock | G06F 3/04886 | |
| | | | 704/9 | |
| 2015/0199426 A1* | 7/2015 | Lim | G06F 17/30696 | |
| | | | 707/723 | |
| 2015/0248386 A1* | 9/2015 | Lin | G06F 40/166 | |
| | | | 715/271 | |
| 2015/0355727 A1* | 12/2015 | Hu | G06F 40/274 | |
| | | | 345/169 | |
| 2016/0328377 A1* | 11/2016 | Spencer | G06F 3/04886 | |
| 2017/0220129 A1* | 8/2017 | Wu | G06F 16/3346 | |

\* cited by examiner

METHOD AND SYSTEM FOR RANKING CANDIDATES IN INPUT METHOD

CROSS-REFERENCES TO RELATED APPLICATIONS

This application claims the priority of Chinese Patent Application No. 201610809488.1 filed on Sep. 7, 2016, the entire contents of which are incorporated herein by reference.

FIELD OF THE DISCLOSURE

The present disclosure relates to the technical field of input method and, more particularly, relates to a method and a system for ranking candidates in an input method.

BACKGROUND

With the rapid development of terminal devices and technologies, the users can, based on information transmission manners, use mobile terminals to realize various functionalities, such as the record of literal information and usage of communication software. In usage of mobile terminals, input of the literal information using the input method and the virtual keyboard on the mobile terminals is one of the most commonly used functionalities of the mobile terminals. However, due to the limitations on the size of the screen of a mobile terminal, when a user inputs literal information using the virtual keyboard displayed on the screen of the mobile terminal, erroneous input may often occur because the user's finger may press key(s) surrounding the target key.

Currently, in order to solve the above issue, mobile terminals having a large screen may be used, or Jiugongge keyboards (square nine key keyboards) may be used, so that the area of each key on the keyboard is enlarged. However, the keys on the Jiugongge keyboard are not suitable for all input methods, and steps for users to select input candidates are increased when the Jiugongge keyboards are used, which results in reduced input efficiency of characters.

BRIEF SUMMARY OF THE DISCLOSURE

In view of the above issues, embodiments of the present disclosure are proposed to provide a method and a system for ranking candidates in an input method, which are capable of overcoming all or at least a part of the above-discussed issues.

In order to address the above issues, a method for ranking candidates in an input method is provided, including: receiving an initial key code string inputted by a user using an input method; and for each character in the initial key code string, obtaining a weight of the character and weights of characters surrounding the character, and based on a character input method, establishing a key code string weight list with a corresponding hierarchy. Further, the disclosed method further includes: when character combinations are obtained from a dictionary, according to a correspondence relationship between a hierarchy in the dictionary of the input method and the hierarchy in the key code string weight list, determining weights of the character combinations using the key code string weight list; and based on the weights of the character combinations, ranking candidates corresponding to the character combinations.

Further, a system for ranking candidates in an input method is provided, including: an initial key code string receiving module, a key code string weight list establishing module, a weight determination module, and a candidate ranking determination module. The initial key code string receiving module is configured to receive an initial key code string inputted by a user using an input method. The key code string weight list establishing module is configured to, for each character in the initial key code string, obtain a weight of the character and weights of characters surrounding the character, and establish a key code string weight list with a corresponding hierarchy according to a character input order. The weight determination module is configured to, when character combinations are obtained from a dictionary, according to a correspondence relationship between a hierarchy in the dictionary of the input method and the hierarchy in the key code string weight list, determine weights of the character combinations using the key code string weight list. The candidate ranking determination module is configured to, based on the weights of the character combinations, ranking candidates corresponding to the character combinations.

Embodiments of the present disclosure may have the following advantages.

In embodiments of the present disclosure, an initial key code string inputted by a user using an input method may be received. For each character in the initial key code string, a weight of the character and weights of characters surrounding the character are obtained, and a key code string weight list with a corresponding hierarchy is established according to a character input order. When character combinations are obtained from a dictionary, according to a correspondence relationship between a hierarchy in the input method dictionary and the hierarchy in the key code string weight list, weights of the character combinations are determined using the key code string weight list. Further, based on the weights of the character combinations, ranking of candidates corresponding to the character combinations is determined. Thus, embodiments of the present disclosure may solve the issue of wrong candidate input caused by frequent touch of a user's finger on keys surrounding the target key when the user inputs literal information using a virtual keyboard displayed on a mobile terminal. Accordingly, the error-correcting capability during input of the key codes by the user may be improved, and the accuracy of the candidates in the input method may be increased.

DETAILED DESCRIPTION

In order to make the above objectives, features and advantages of the present disclosure clearer, the present disclosure will be described more fully hereinafter with reference to the accompanying drawings and specific implementations.

First Embodiment

Figure 1:
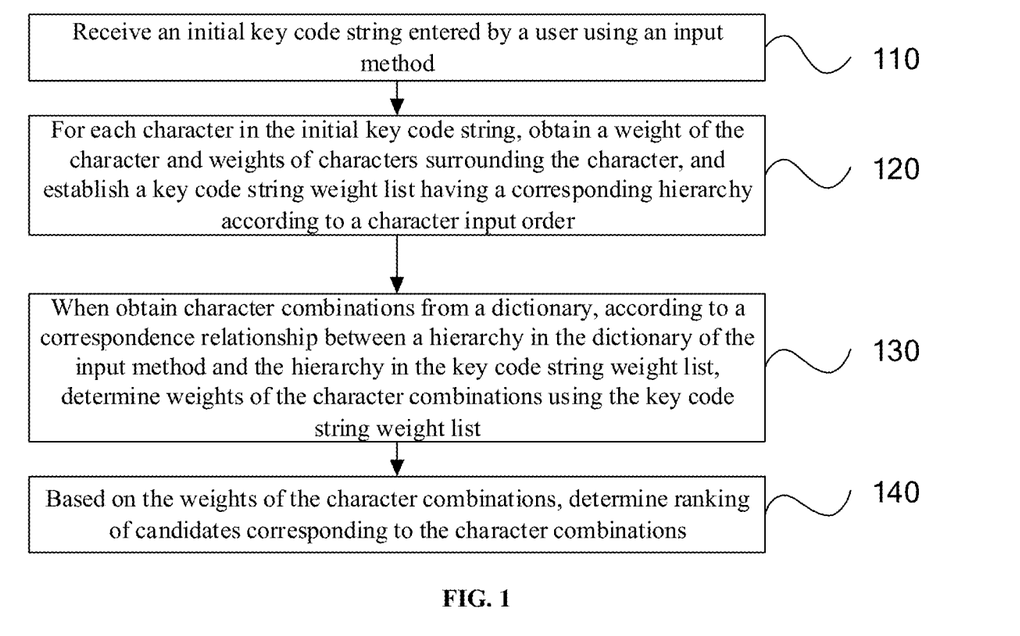
FIG. 1 is a flowchart showing a method for ranking candidates in an input method according to embodiments of the present disclosure.

FIG. 1 is a flowchart showing a method for ranking candidates in an input method according to embodiments of the present disclosure. As shown in FIG. 1, the method may include the following steps.

In step 110, an initial key code string inputted by a user using an input method is received.

Figure 1A:
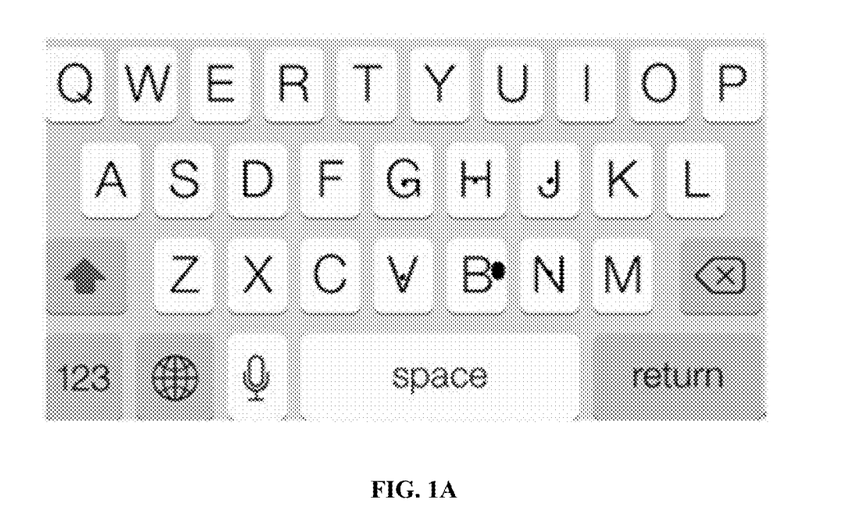
FIG. 1A is a schematic diagram showing an example of a keyboard for an input method.

In the present disclosure, when a user inputs literal information using a mobile terminal, a virtual keyboard interface may pop up from the display interface of the mobile terminal. By receiving touch operations of the user on the screen of the mobile terminal, because the touch points of the touch operations may correspond to key values on the virtual keyboard of the display interface, the key code string inputted by the user may be determined. FIG. 1A shows a virtual keyboard on a display interface of a mobile terminal. As shown in FIG. 1A, the key value that the user wants to input may be determined from the touch point of the user on the screen, and a plurality of key values inputted by the user form the inputted initial key code string.

In step 120, for each character in the initial key code string, a weight of the character and weights of characters surrounding the character are obtained, and a key code string weight list with a corresponding hierarchy is established according to a character input order.

More specifically, after a plurality of key values (i.e., initial key values) inputted by the user are recorded into an initial key code string, based on each key value clicked by the user, keys surrounding each key that corresponds to an initial key value may be marked, where each key that corresponds to an initial key value may be treated as an initial key. According to the distances from the surrounding keys to the initial keys, weight values of the initial keys and the surrounding keys are marked. Further, the key values of the keys in the initial key code string, the key values of the surrounding keys, and the weight values thereof are recorded to generate a hierarchical key code string weight list.

Figure 1B:
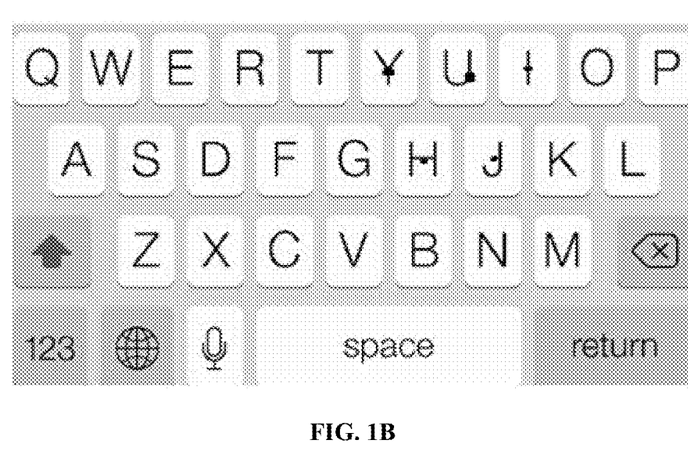
FIG. 1B is a schematic diagram showing another example of a keyboard for an input method.
Figure 1C:
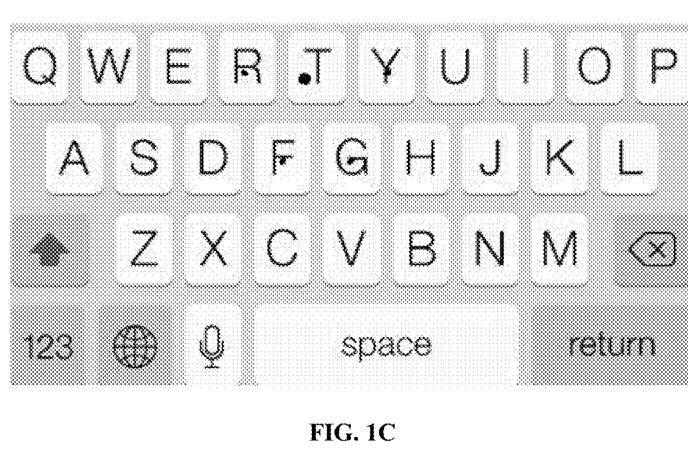
FIG. 1C is a schematic diagram showing another example of a keyboard for an input method.

For example, if the user wants to input an English word "BUT", the user may need to sequentially click or touch keys "B", "U", and "T" on the keyboard, as shown in FIGS. 1A, 1B and 1C. When the touch operations on the three keys of "B", "U" and "T" are received, the keys surrounding the three keys are marked, respectively. Specifically, the keys surrounding the key "B" include five keys: "V", "G", "H", "J", and "N"; the keys surrounding the key "U" include four keys: "Y", "H", "J", and "I"; and the keys surrounding the key "T" include four keys: "R", "F", "G", and "Y".

Further, after the keys surrounding the initial keys are marked, the distances from the initial keys to the respective surrounding keys may be calculated according to the coordinates of the central points of the surrounding keys and the coordinates of the central points of the initial keys. Based on the distances, weight values of the initial keys and the surrounding keys may be assigned or marked. For example, the weight value of an initial key may be assumed to be 5.0, the weight value of the key closest to the initial key may be marked as 4.5, the weight value of the key second closest to the initial key may be marked as 4.0, etc., until the weight values of all keys surrounding the initial key are marked and recorded.

According to the rules above, the key code string weight list for "BUT" may be obtained as follows:

{
{[B,5.0], [N,4.5], [J,4.0], [V,3.5], [H,3.0], [G,2.5]},
{[U,5.0], [I,4.5], [J,4.0], [H,3.5[, [Y,3.0]},
{[T,5.0], [R,4.5], [F,4.0], [G,3.5], [Y,3.0]}
}

In step 130, when character combinations are obtained from a dictionary, according to a correspondence relationship between a hierarchy in the input method dictionary and the hierarchy in the key code string weight list, weights of the character combinations are determined using the key code string weight list.

More specifically, after the key code string weight list of the initially entered characters is determined, according to the positions of characters in the tree structure of the dictionary of the input method currently used by the user, characters in the key code string weight list are matched, and based on sub-nodes of the match results, further matching is performed. Accordingly, for each character in the key code string weight list, corresponding character combinations in the dictionary of the input method may be obtained. Further, according to the weight values of the match results in each level of the dictionary of the input method, the weight values of the character combinations may be calculated.

In step 140, based on the weights of the character combinations, ranking of candidates corresponding to the character combinations is determined.

More specifically, according to the calculated weights of the character combinations, the character combinations obtained from the input method dictionary are ranked, and the greater the weight of a character combination, the higher the ranking of the character combination. Further, optionally, the ranking of the candidates formed by the character combinations may be adjusted based on the input habit of the user performing the current input and the input lexicon selected by the user. Further, in the current input method, the weights may be further calculated by performing big-data statistics on the features such as the input frequency of the aforementioned candidates. Embodiments of the present disclosure are not intended to be limiting.

In the embodiment of the present disclosure, an initial key code string inputted by a user using an input method is received, and for each character in the initial key code string, a weight of the character and weights of characters surrounding the character are obtained. Further, a key code string weight list with a corresponding hierarchy is established according to a character input order. When character combinations are obtained from a dictionary, according to a correspondence relationship between a hierarchy in the dictionary of the input method and the hierarchy in the key code string weight list, weights of the character combinations are determined using the key code string weight list. Based on the weights of the character combinations, ranking of candidates corresponding to the character combinations is determined.

As such, the embodiment of the present disclosure can solve the issue of erroneous candidate input caused by frequent touch of a user's finger on keys surrounding the target key when the user inputs literal information using a virtual keyboard displayed on a mobile terminal. Accordingly, the error-correcting capability during input of key codes by the user and increasing, and the accuracy of the candidates in the input method may be increased.

Second Embodiment

Figure 2:
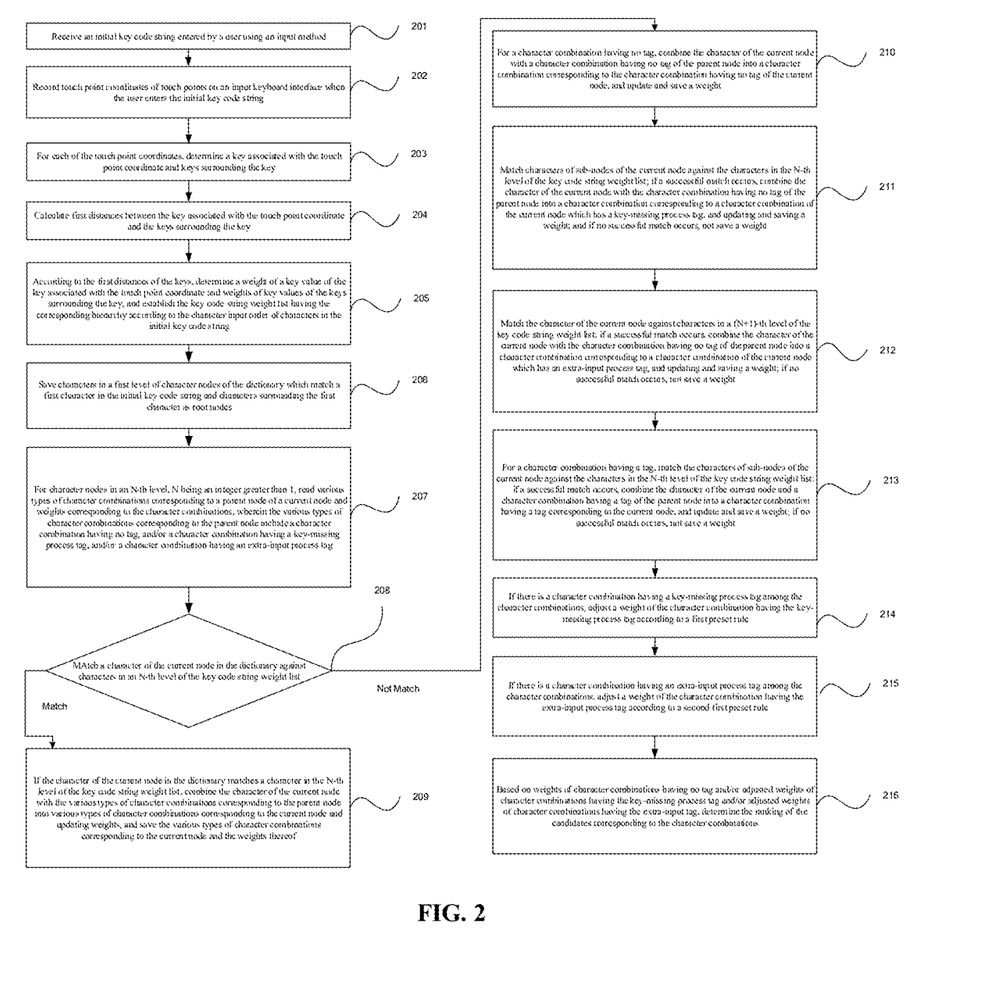
FIG. 2 is a flowchart showing another method for ranking candidates in an input method according to embodiments of the present disclosure.

FIG. 2 is a flowchart showing a method for ranking candidates in an input method according to embodiments of the present disclosure. As shown in FIG. 2, the method may include the following steps.

In step 201, an initial key code string inputted by a user using an input method is received.

This step is the same with the step 110 in the first embodiment, and repeated descriptions are omitted here.

In step 202, touch-point coordinates of touch points on an input keyboard interface are recorded when the user inputs the initial key code string.

More specifically, via the touch-sensitive elements in the display screen of the mobile terminal, touch operations of the user on the display screen may be received. Often, the display screen of a mobile terminal may be a thermal capacitive screen or a resistive screen. For a resistive screen, by detecting gentle touch or press from the user, the touch operations of the user may be recognized. The capacitive screen detects the touch operations of the user by sensing human body heat, and may realize multi-point touch. Thus, the display screen of the mobile terminal may capture the touch points of each touch operation of the user via the touch operations of the user, and obtain touch-point coordinates of the touch points on the display screen.

In step 203, for each of the touch-point coordinates, a key associated with the touch-point coordinate and keys surrounding such key are determined.

More specifically, when the user touches the display screen of the mobile terminal, either pressure sensing or thermal sensing may receive the touch operations of the user. When the touch operations of the user are received, after the touch-point coordinates are obtained according to the touch points on the screen, the key values of the initial keys of the user may be obtained based on the touch-point coordinates and the coordinates of each key on the virtual keyboard of the display screen. After the initial keys are determined, the keys surrounding the initial keys may be further determined. For example, as shown in FIG. 1A, when the initial position touched by the user on the display screen of the mobile terminal is the position marked with the large black dot, by calculating the coordinates of the large black dot on the display screen, the key closest to the large black dot is determined to be key "B" on the virtual keyboard. Thus, the initial key code of the current touch by the user is "B". After the initial key code "B" is determined, the keys surrounding the key "B" may be determined to be "G", "H", "V", "J", and "N".

In step 204, first distances between each key associated with corresponding touch-point coordinates and the keys surrounding the key are calculated.

More specifically, based on the description in step 203, after the keys surrounding the key "B" are determined as "G", "H", "V", "J" and "N", distances between the coordinates of the central points of the keys "G", "H", "V", "J" and "N" and the coordinates of the user's initial touch points are calculated as the first distances. For example, while the large black dot in FIG. 1A represents the position where the coordinates of the central point of the key "B" are, the small black dots in FIG. 1A represent the positions where the coordinates of the central points of the keys "G", "H", "V", "J" and "N" are. Thus, to calculate the first distances is to calculate the distances from the large black dot to the small black dots.

In step 205, according to the first distances of each key, a weight of a key value of the key associated with the touch-point coordinates and weights of key values of the keys surrounding the key are determined, and a key code string weight list with the corresponding hierarchy is established according to the character input order of the characters in the initial key code string.

More specifically, according to the distances between the coordinates of the user's initial touch point and the surrounding keys, the weights may be marked for the key values corresponding to the keys. For example, as shown in FIG. 1A, if the key corresponding to the user's touch point is determined to be the key "B", based on the calculation of the distances from the surrounding keys to the initial touch-point coordinates of the key "B", a key code "B" may be obtained. Further, the weight of the key code "B" is marked as 5.0, the weight of the key closest to the key code "B" is marked as 5*0.9, the weight of the key second closest to the key code "B" is 5*0.8, the weight of the key third closest to the key code "B" is 5*0.7, and so on, so that a weight list may be obtained as follows:

{[B,5.0], [N,4.5], [J,4.0], [V,3.5], [H,3.0], [G,2.5]}.

Similarly, as shown in FIG. 1B, it can be determined that the second key code inputted by the user is "U", and the key code weight list for "U" may be obtained as follows:

{[U,5.0], [I,4.5], [J,4.0], [H,3.5], [Y,3.0]}.

As shown in FIG. 1C, the third key code inputted by the user is "T", and the key code weight list for "T" may be obtained as follows:

{[T,5.0], [R,4.5], [F,4.0], [G,3.5], [Y,3.0]}.

As such, the weight list for the key code string inputted by the user may be obtained as follows:

{
{[B,5.0], [N,4.5], [J,4.0], [V,3.5], [H,3.0], [G,2.5]},
{[U,5.0], [I,4.5], [J,4.0], [H,3.5], [Y,3.0]},
{[T,5.0], [R,4.5], [F,4.0], [G,3.5], [Y,3.0]}
}

In step 206, characters in a first level of character nodes of the dictionary that match a first character in the initial key code string and characters surrounding the first character are saved as root nodes.

Figure 2A:
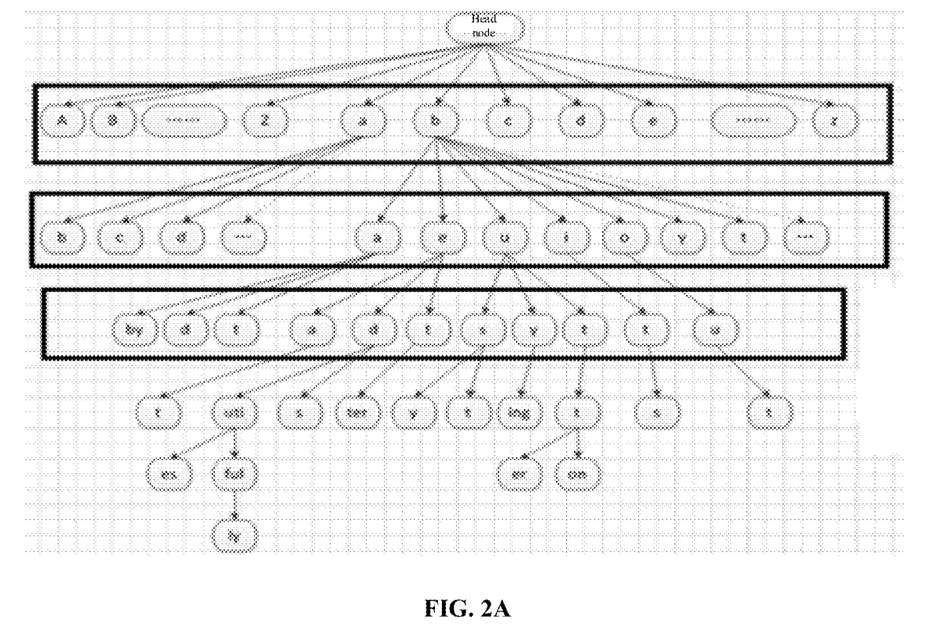
FIG. 2A is a schematic diagram showing a tree structure of a dictionary in an input method.

For example, FIG. 2A depicts a tree structure of a dictionary corresponding to an English input method. According to the tree structure, the head node is null, the first level includes 52 sub-nodes storing 26 capital letters and 26 small letters, respectively. Further, in the tree structure, the sub-nodes in the second level are below the 52 sub-nodes in the first level, and each sub-node in the second level stores a letter or letters forming a part of a word, where the word begins with a corresponding letter in the first level.

Optionally, sub-nodes in the second level associated with each of the 26 capital letters in the first level store the same letter(s) as sub-nodes in the second level that are associated with a corresponding small letter in the first level. That is, the sub-nodes in the second level associated with the capital letter "B" in the first level may have the same letter(s) as sub-nodes in the second level that are associated with the small letter "b" in the first level.

Further, sub-nodes corresponding to each letter may include all letters that possibly form a word with the letter, and each letter node stores a tag that indicates whether the letter(s) can be an end of a word. Further, each letter node may store a length of the character string in the node and the positions of the sub-brother nodes therebelow. If the tag indicates that the letter is an end of a word, the tag may be further marked with the frequency of the word in the current input method.

Using the above-described input method dictionary as an example, if the initial key code string inputted by the user is "BUT", the characters of {[B,5.0], [N,4.5], [J,4.0], [V,3.5], [H,3.0], [G,2.5]} in the "B"-level of the key code string weight list are matched with the 52 sub-nodes in the first level of the dictionary one by one. According to the match results, the characters on the result nodes, the lexicon addresses of the nodes, the weights of the nodes in the key code string weight list are stored in the buffer of the current system.

For characters in each node based on a root node, the weights of the character combinations are determined using the following procedure until traversal of characters of all nodes is finished.

In step 207, for character nodes in an N-th level, where N is an integer greater than 1, various types of character combinations corresponding to a parent node of a current node and corresponding weights of the character combinations are read. The various types of character combinations corresponding to the parent node may comprise: a character combination carrying no tag, and/or a character combination carrying a key-missing process tag, and/or a character combination carrying an extra-input process tag.

More specifically, after match of the initial key code string inputted by the user in the first level of the dictionary of the input method is finished, a first key code in the key code string is selected from the match result, and the sub-nodes of the first key code are retrieved. The sub-nodes in the second level are compared with the second key in the key code string and the keys surrounding the second key one by one, and if the first character on a node is the second key or one of the surrounding keys, comparison continues and the second character on the node is compared with the third key in the key code string and the keys surrounding the third key, etc., until all the characters on the node are compared.

If all matches are successful, the characters on the aforementioned anode and the character accumulated from the parent node are combined into a character combination. Further, the lexicon addresses and weight values of the nodes, and the accumulated weight values (i.e., the weight values) accumulated from the parent nodes are saved. During the matching procedure, if the match is not successful, the current node is processed based on three situations. In a first situation where the user presses a wrong key, the weight value of the character on the current node is set to 0 and is saved without any tag.

In a second situation where the user misses to press a key, the next character is compared with the current key and the keys surrounding the current key. If the next character matches the current key or one of the keys surrounding the current key, a key-missing indication is added, the node is saved, and a key-missing process tag is marked; and if the next character does not match the current key or anyone of the keys surrounding the current key, no saving is performed.

In a third situation where an extra key is touched or pressed by the user, the current character of the current node is compared with the next key and surrounding keys. If the match is successful, an extra-input process tag is added, and the node is saved; and if the match is not successful, no saving is performed. For details, please see Table 1:

TABLE 1

| Accumulated character string | Weight value | Descriptions |
|---|---|---|
| ba | 5.0 | The node "a" is 0 (with no tag). |
| ba | 5.0 | The node "a" is 0, and "a" is marked (with a key-missing process tag). |
| ba | 0 | The node "a" is 0, the character "a" is not the third key or one of the surrounding keys, and thus the node "a" is discarded. |
| be | 5.0 | The node "e" is 0. |
| be | 5.0 | The node "e" is 0, and is marked (with an extra-input process tag). |
| be | 0 | The node "e" is 0, the character "e" is not the third key or one of the surrounding keys, and thus the node e is discarded. |
| bu | 10.0 | The node "u" is 5.0, and if the match is successful, no comparison is performed for the extra-key and key-missing situations. |
| bi | 9.5 | The node "i" is 4.5. |
| bo | — | the same as "ba" |
| by | 8.0 | The weight value of the node "y" is 3.0. |
| bt | 5.0 | The node "t" is 0. |
| bt | 5.0 | The node "t" is 0, and is marked (with a key-missing process tag). |
| bt | 10.0 | The node "t" is 5.0, and u is marked (with an extra-input process tag). |
| ... | ... | |

In step 208, a character of the current node in the dictionary is matched with characters in an N-th level of the key code string weight list.

In the embodiment of the present disclosure, according to the description in step 207, the procedure for matching the dictionary characters with the characters in an N-th level of the key code string weight list is further illustrated hereinafter. After the matching in the first level of the dictionary is finished, the sub-nodes of the first matched character, for example, the sub-nodes of the character "B", are selected. According to the present disclosure, in the tree structure of the input method dictionary, the sub-nodes of the character "B" may be the same as the sub-nodes of the character "b", and the arrangement order of the sub-nodes of the character "B" may be the same as the arrangement order of the sub-nodes of the character "b".

Referring to the dictionary shown in FIG. 2A, the sub-nodes of the character "B" may be found to include "a", "e", "u", "i", "o", "y", and "t", etc., and such sub-nodes correspond to the second level of the dictionary. After the sub-nodes of the character "B" are obtained, the characters in the second level of the key code string weight list are matched with the first character in the sub-nodes of the character "B". That is, "a" is matched with {[U,5.0], [I,4.5], [J,4.0], [H,3.5], [Y,3.0]} one by one, and the next step may be performed according to the match result.

In step 209, if the character of the current node in the dictionary matches a character in the N-th level of the key code string weight list, the character of the current node is respectively combined with various types of character combinations corresponding to the parent node to obtain various types of character combinations corresponding to the current node, and the weights are updated. Further, the various types of character combinations corresponding to the current node and the weights corresponding to the various types of character combinations are saved.

In the embodiment of the present disclosure, according to the description in step 209, after matching the sub-nodes of the character "B" with "{[U,5.0], [I,4.5], [J,4.0], [H,3.5], [Y,3.0]}" one by one, if the match is successful, the character combinations of such node are recorded, and the weights are updated and saved. For example, according to descriptions in Table 1, the sub-node "u" of the character "B" matches [U,5.0] in {[U,5.0], [I,4.5], [J,4.0], [H,3.5], [Y,3.0]}. Thus, the weights of the two characters are added to obtain an updated weight value of 10.0, and the character combination formed by the characters "B" and "u" are saved as "Bu".

If the character of the current node does not match any character in the N-th level of the key code string weight list, the following steps may be performed.

In step 210, for a character combination carrying no tag, the character of the current node is combined with a character combination of the parent node carrying no tag into a character combination of the character combination with no tag corresponding to the current node, and a weight is updated and saved.

In the embodiment of the present disclosure, according to the description of step 209, the sub-nodes of the character "B" are matched with "{[U,5.0], [I,4.5], [J,4.0], [H,3.5], [Y,3.0]}" one by one. For example, if "a" does not matches any one of the characters in the weight list, the different processes may be carried out under three situations based on descriptions in step 207.

As shown in Table 1, three situations regarding "a" are illustrated. If "a" carries no tag, the weight of "a" is 0, and because the weight of "ba" is the sum of the weight of "b" (i.e., 5.0) and the weight of "a", the weight of "ba" is 5.0. Similarly, under the second situation, if "a" has a key-missing process tag, the weight of "ba" is 5.0. Under the third case where "a" has an extra-input process tag, "a" is matched with the third level of the key code string weight list. If the match is successful, the tag is maintained, and the character combination is saved in a buffer of the system; and if the match is not successful, no saving is performed. Because after matching "a" with the characters of {[T,5.0], [R,4.5], [F,4.0], [G,3.5], [Y,3.0]} in the third-level of the key code string weight list one by one, no matched character is found, the extra-input process tag, the character combination of the characters, and the weight thereof are not recorded, as shown in the third row of Table 1.

In step 211, characters of sub-nodes of the current node are matched with the characters in the N-th level of the key code string weight list. If a successful match occurs, the character of the current node is combined with the character combination of the parent node carrying no tag into a character combination of a character combination that carries a key-missing process tag corresponding to the current node, and the weight is updated and saved. If no successful matching occurs, the weight is not saved.

In the embodiment of the present disclosure, according to the description in step 209, the data of the three situations (i.e., the contents in Table 1) are saved based on the parent node of the current node. The characters in a corresponding level of the key code string weight list corresponding to the current node are matched with the character combinations carrying a key-missing process tag one by one. If the matching is successful, the matched character is combined with the character combination formed by the parent node into a new character combination, and the weight value of the new character combination is saved in the buffer of the system. If the matching between the character and the key or the surrounding keys is failed, and the key-missing and extra-input processes have been performed on the previous level, key-missing or extra-input process is not further performed. Accordingly, a too large deviation of the keys from the word may be avoided. The above-described processes are performed on each node in the current level of the dictionary until the entire matching process is completed, and the processes on the next level of the dictionary are conducted according to the saved new character combinations.

In step 212, the character of the current node is matched with the characters in a (N+1)-th level of the key code string weight list. If a successful matching occurs, the character of the current node is combined with the character combination of the parent node carrying no tag into a character combination corresponding to a character combination of the current node that carries an extra-input process tag, and a weight is updated and saved. If no successful matching occurs, a weight is not saved.

In the embodiment of the present disclosure, step 212 is similar to step 211, and performs matching of the characters of the parent node carrying an extra-input process tag. Similarly, if the matching is successful, the matched character is combined with the character combinations formed by the parent node to generate a new character combination, and the weight value of the new character combination is saved in the buffer of the system. If the matching between the character and the key or the surrounding keys fails, and the key-missing and extra-input processes have been performed on the previous level, key-missing or extra-input process is not further performed. Thus, a large difference between the keys and the words may be avoided. The above-described processes are performed on each node in the current level of the dictionary until all matching are finished, and the processes on the next level may be conducted based on the saved new character combinations.

In step 213, for a character combination carrying a tag, the characters of sub-nodes of the current node are matched with the characters in the N-th level of the key code string weight list. If a successful match occurs, the character of the current node is combined with a character combination of the parent node carrying a tag into a character combination carrying a tag corresponding to the current node, and a weight is updated and saved. If no successful match occurs, a weight is not saved.

In the embodiment of the present disclosure, for the character combination carrying a key-missing process tag, the characters of sub-nodes of the character are matched with the corresponding characters in the upper level of the key code string weight list one by one. For example, in the second row of Table 1, "a" is marked as "with a key-missing process tag", and the sub-nodes of "a" (i.e., "by", "d", "t") are matched with the characters in "{[U,5.0], [I,4.5], [J,4.0], [H,3.5], [Y,3.0]}" one by one. If a successful match occurs, the matched character of the sub-node of "a" is combined with the previously formed character combination into a new character combination, and the weight of the new character combination is recorded and saved in the buffer of the system. If no successful match occurs, no saving is performed. As shown in Table 2, after "a" is marked as "with a key-missing process tag", the sub-nodes of "a" (i.e., "by", "d", "t") are matched with "{[U,5.0], [I,4.5], [J,4.0], [H,3.5], [Y,3.0]}" one by one, and no successful match is found. Thus, the contents in Table 2 are discarded.

TABLE 2

| Accumulated character string | Weight value | Descriptions |
|---|---|---|
| baby | 5.0 | The node "by" is 0, and does not match the characters in "b" and "u" level of the weight list. |
| bad | 5.0 | The node "d" is 0, and does not match the characters in "d" and "u" level of the weight list. |
| bat | 5.0 | The node "t" is 0, and does not match the characters in "t" and "u" level of the weight list. |

In the embodiment of the present disclosure, for a current-level character carrying an extra-input process tag, the character is, under normal situations, matched with the characters in the current level of the key code weight list. If a successful match occurs, the matching character is combined with the upper level character combination, and the new character combination and a weight thereof are saved; and if no successful match occurs, the character is discarded.

In step 214, when a character combination carrying a key-missing process tag exists among the character combinations, a weight of the character combination carrying the key-missing process tag is adjusted according to a first preset rule.

In the embodiment of the present disclosure, according to the descriptions in steps 206 to 214, if the matching process for all characters are finished, the information eventually saved is processed. Among all the generated character combinations, the generated character combinations are different because the sub-nodes of each character in the dictionary are different. However, the calculated weights may be the same. For example, the character combination carrying a key-missing process tag and a character combination carrying no tag may have the same weight. As described in Table 3, the weight of the character combination "but" and the weight of the character "butter" are the same based on comparison between the dictionary and the key code string weight list. When the user inputs "but", based on the initial key code string inputted by the user, "but" should have the highest ranking among all candidates. Because "butter" is an extended candidate generated according to a sub-node of the dictionary and the key code string has a length longer than that of the initial key code string, the weight value of "butter" should be multiplied by 0.9. The weight values of the rest candidates in Table 3 may be processed according to the above rule. Further, in practical application, the current weight values may be further processed according to features of the candidate, such as the frequency, and popularity over network, and embodiments of the present disclosure are not limited thereto.

TABLE 3

| Word | Weight values | Descriptions |
|---|---|---|
| but | 15.0 | The three keys exactly match the word, such that the word has the highest weight value. |
| butter | 13.5 | The word "butter" includes "but", and the weight value of "butter" is obtained by multiplying the weight value of "but" by 0.9. |
| button | 13.5 | same with "butter" |
| bit | 14.5 | The weight value of "i" is 4.5, and the weight value of each of the remaining two letters is 5.0. |
| bits | 13.05 | The word "bits" includes "bit", and the weight value of "bits" can be obtained by multiplying the weight value of "bit" by 0.9. |
| buy | 13.0 | The weight value of "y" is 3, and the weight value of each of the remaining two letters is 5.0. |
| buying | 11.7 | The word "buying" includes "buy", and the weight value of "buying" should be obtained by multiplying the weight value of "buy" by 0.9. |
| buys | 11.7 | same with "buying" |
| bt | 14.5 | The "bt" has an extra-input tag of "u", and the weight value should be compensated according to the above formula. |
| bust | 13.5 | There are three characters in "bust" which are the same as that in "but", but there is a key-missing tag. Thus the weight value of "bust" is obtained by multiplying the weight value of "but" by 0.9. |
| bout | 13.5 | The same as "bust" |
| bat | 10.0 | The word "bat" have two keys the same as that in "but", both showing a weight value of 5.0. |
| bet | 10.0 | The same as "bat" |
| better | 9.0 | The word "better" includes "bet", and the weight value of "better" is obtained by multiplying the weight value of "bet" by 0.9. |
| bus | 10.0 | The same as "bat" |

In step 215, when a character combination carrying an extra-input process tag exist among the character combinations, a weight of the character combination carrying the extra-input process tag is adjusted according to a second first preset rule.

In the embodiment of the preset disclosure, according to the descriptions regarding steps 206 to 214, if the matching processes for all characters are finished, the eventually saved information is processed according to all the key codes. Information of the first node is retrieved, and whether an extra-input process tag is carried is determined. If an extra-input process tag exists, the weight value needs to be compensated. For example, when four key codes are inputted, the normal comparison result is accumulation of the weight values of the four key codes. If the extra-input key code process is performed, because one key code is neglected, only the weight values of three key codes are accumulated. In order to ensure the ranking under the same conditions, all information of the extra-input key code needs to undergo weight value compensation, and the compensated weight value=(the current weight value÷(the length of the key code-1))*0.9. Further, whether one key code is missing is determined; if one key code is missing, the weight value needs to be multiplied by 0.9. For example, if the user inputs "abc", the weight value of "abc" should be higher than the weight value of "a×bc" and the weight value of "ab×c". Next, whether the current node is the end node of a word is determined. If the current node is the end node of a word, whether the last character of the node has been compared is determined (if the last character of the node has been compared, the length of the key code is indicated to be equal to the length of the word). If the last character of the node has been compared, the accumulated character combinations, the addresses in the lexicon, and the accumulated weight values are saved in a word list. Further, all the sub-nodes of the current node are retrieved, and all the words under the current node are saved in the word list, including the addresses of the words in the lexicon. The accumulated weight values are saved after being multiplied by 0.9. Here, the original weight values are scaled down, and because the subsequent words are actually key-code-compensating blurry results, the weight values need to be lowered. For example, if "abc" is inputted, the weight value of "abc" is higher than the weight values of words "abed", and "abcef", etc. All results obtained after comparison undergo the same processing to generate a word list. The word list includes word letters, the weight values corresponding to the words, and the addresses of the words in the lexicon.

In step 216, based on weights of character combinations carrying no tag and/or adjusted weights of character combinations carrying the key-missing process tag and/or adjusted weights of character combinations carrying the extra-input tag, the ranking of the candidates corresponding to the character combinations is determined.

In the embodiment of the present disclosure, if all characters fulfill matching, for all key codes, after processing the weight of the eventually saved information based on steps 214 and 215, all the eventually obtained character combinations are ranked. Through the address of each character of a character combination in the lexicon, the frequency of the character combination, the personal habit of the user, and the usage frequency of the word may be acquired. Further, whether this word has a binary relationship with the word before the cursor in the editor may be obtained. The final ranking may be determined based on the following factors. Optionally, in practical applications, other factors may change the ranking of the character combinations as input candidates, and embodiments of the present disclosure are not intended to be limiting.

Optionally, step 216 may include: according to the weights of the character combinations carrying no tag, and/or the adjusted weights of the character combinations carrying the key-missing process tag, and/or the adjusted weights of the character combinations carrying the extra-input process tag, frequency of the character combinations, usage frequency of the character combinations, time periods from the time the character combinations are lastly used to the current moment, and multi-element relationships between the character combinations and previously entered words, calculating a comprehensive weight for each character combination.

In the embodiment of the present disclosure, based on the address of each character of a character combination in the lexicon, the frequency of the character combination may be obtained. Further, based on the intrinsic frequency of the character combination, the usage frequency of the character combination, the time period from the time the character combination is lastly used to the current moment, and the multi-element relationships between character combination and previously inputted words, a comprehensive weight of each character combination may be calculated. Optionally, in practical applications, other factors may change the ranking of character combinations that serve as input candidates, and embodiments of the present disclosure are not limited thereto.

Based on the comprehensive weights of the character combinations, the candidates corresponding to the character combinations are ranked.

In the embodiment of the present disclosure, according to the calculated comprehensive weights of all the candidate character combinations, the character combinations may be ranked based on the weights. The ranked candidates are displayed on a current candidate display bar of the input method for selection by the user.

In the embodiment of the present disclosure, an initial key code string inputted by a user using an input method is received, and for each character in the initial key code string, a weight of the character and weights of characters surrounding the character are obtained. A key code string weight list carrying a corresponding hierarchy is established according to a character input order. When character combinations are obtained from a dictionary, according to a correspondence relationship between a hierarchy in the input method dictionary and the hierarchy in the key code string weight list, weights of the character combinations are determined using the key code string weight list. Further, take into consideration the weights of the character combinations and a plurality of features with respect to the candidate character combinations, the weights are further processed, and ranking of candidates corresponding to the character combinations is determined based on the processed weight values.

As such, embodiments of the present disclosure can solve the issue of erroneous candidate input caused by frequent touch of a user's finger on keys surrounding the target key when the user inputs literal information using a virtual keyboard displayed on a mobile terminal. Accordingly, the error-correcting capability of the user in key code input may be improved, and the accuracy of the candidates of the input method may be increased.

Third Embodiment

Figure 3:
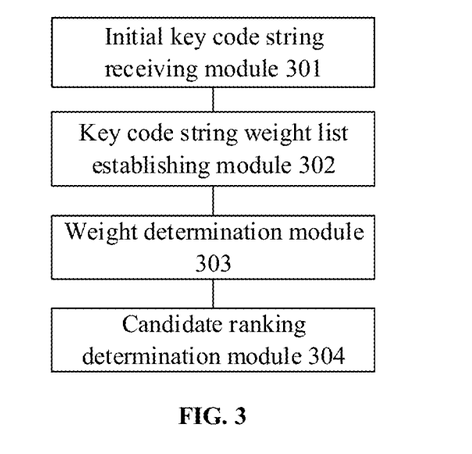
FIG. 3 is a block diagram showing a system for ranking candidates in an input method according to embodiments of the present disclosure.

FIG. 3 is a block diagram showing a system for ranking candidates in an input method according to an embodiment of the present disclosure. The system may include an initial key code string receiving module 301, a key code string weight list establishing module 302, a weight determination module 303 and a candidate ranking determination module 304.

The functions of each module and interactions between the modules will be described, respectively, in detail hereinafter.

Figure 4:
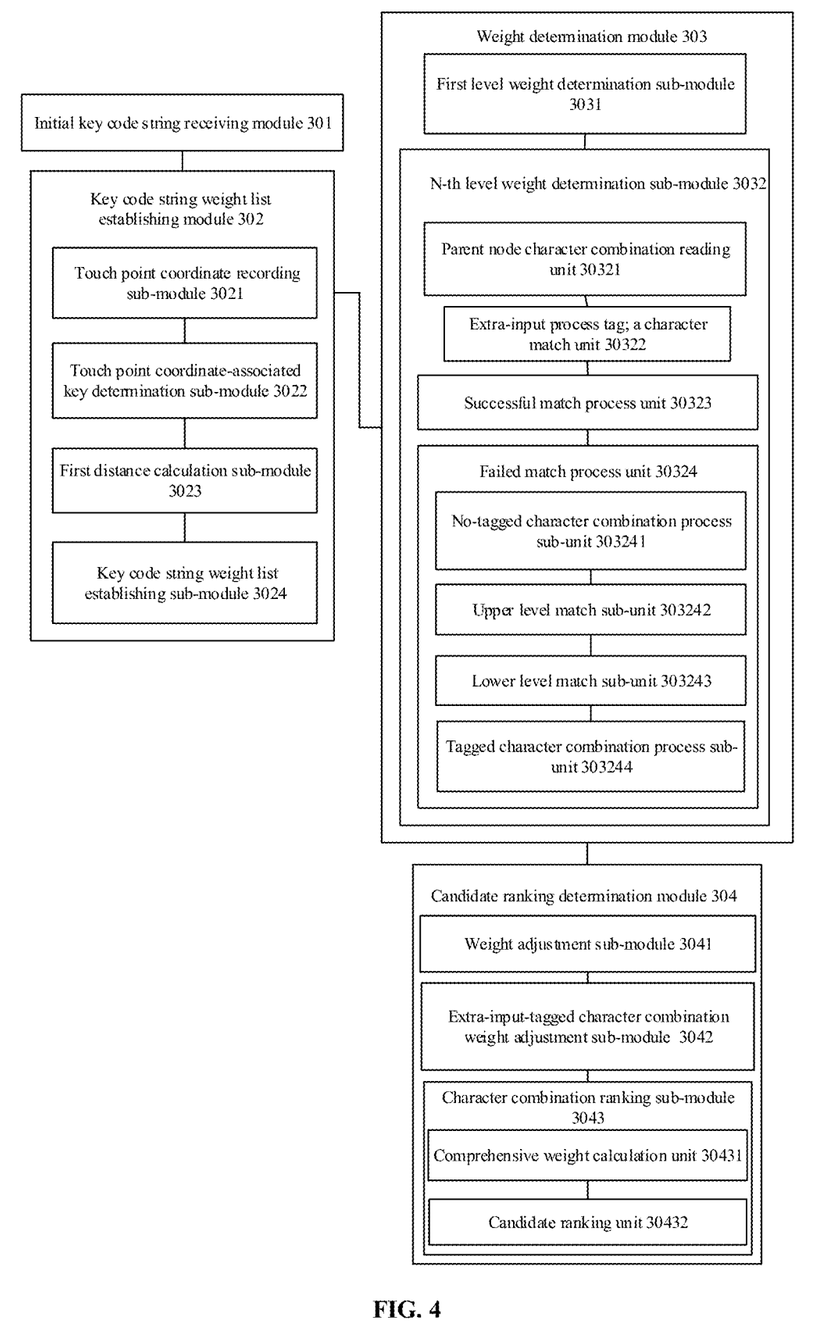
FIG. 4 is a block diagram showing another system for ranking candidates in an input method according to embodiments of the present disclosure.

Referring to FIG. 4, the initial key code string receiving module 301 is configured to receive an initial key code string inputted by a user using an input method.

The key code string weight list establishing module 302 is configured to, for each character in the initial key code string, obtain a weight of the character and weights of characters surrounding the character, and establish a key code string weight list with a corresponding hierarchy according to a character input order. Optionally, the key code string weight list establishing module 302 may include: a touch-point coordinate recording sub-module 3021, a touch-point coordinate associated key determination sub-module 3022, a first distance calculation sub-module 3023, and a key code string weight list establishing sub-module 3024.

The touch point coordinate recording sub-module 3021 is configured to record touch-point coordinates of touch points on an input keyboard interface when the user inputs the initial key code string. The touch-point coordinate associated key determination sub-module 3022 is configured to, for each of the touch-point coordinates, determine a key associated with the touch-point coordinate and keys surrounding the key. The first distance calculation sub-module 3023 is configured to calculate first distances between the key associated with the touch-point coordinate and the keys surrounding the key. The key code string weight list establishing sub-module 3024 is configured to, according to the first distances of the keys, determine a weight of a key value of the key associated with the touch point coordinate and weights of key values of the keys surrounding the key, and establish the key code string weight list with the corresponding hierarchy according to the input order of characters in the initial key code string.

The weight determination module 303 is configured to, when character combinations are obtained from a dictionary, according to a correspondence relationship between a hierarchy in the input method dictionary and the hierarchy in the key code string weight list, determine weights of the character combinations using the key code string weight list. Optionally, the weight determination module 303 may include: a first-level weight determination sub-module 3031 configured to use characters in a first-level of character nodes of the dictionary that match a first character in the initial key code string and characters surrounding the first character as root nodes; an N-th level weight determination sub-module 3032 configured to, for characters of nodes based on the root nodes, determine the weights of the character combinations using the following procedure until traversal of characters of all nodes is finished.

Further, a parent node character combination reading unit 30321 is configured to, for character nodes in an N-th level, where N is an integer greater than 1, read various types of character combinations corresponding to a parent node of a current node and weights corresponding to the character combinations. The various types of character combinations corresponding to the parent node comprise: a character combination carrying no tag, and/or a character combination carrying a key-missing process tag, and/or a character combination carrying an extra-input process tag. A character match unit 30322 is configured to match a character of the current node in the dictionary with characters in an N-th level of the key code string weight list.

Further, a successful match process unit 30323 is configured to, if the character of the current node in the dictionary matches a character in the N-th level of the key code string weight list, combine the character of the current node with the various types of character combinations corresponding to the parent node into various types of character combinations corresponding to the current node, and update weights, and further save the various types of character combinations corresponding to the current node and the weights corresponding to the various types of character combinations. A failed match process unit 30324 is configured to, if the character of the current node does not match the characters in the N-th level of the key code string weight list, perform the following steps.

Further, a tag-free character combination process sub-unit 303241 is configured to, for a character combination carrying no tag, combine the character of the current node with a character combination carrying no tag of the parent node into a character combination corresponding to the character combination carrying no tag of the current node, and update and save a weight. An upper level match sub-unit 303242 is configured to match characters of sub-nodes of the current node with the characters in the N-th level of the key code string weight list. If a successful match occurs, combine the character of the current node with the character combination carrying no tag of the parent node into a character combination corresponding to a character combination of the current node which has a key-missing process tag, and a weight is updated and saved. If no successful match occurs, the weight is not saved.

Further, a lower level match sub-unit 303243 is configured to match the character of the current node with characters in a (N+1)-th level of the key code string weight list. If a successful match occurs, the character of the current node is combined with the character combination of the parent node carrying no tag into a character combination corresponding to a character combination of the current node which has an extra-input process tag, and a weight is updated and saved. If no successful match occurs, the weight is not saved. A tagged character combination process sub-unit 303244 is configured to, for a character combination carrying a tag, match the characters of sub-nodes of the current node with the characters in the N-th level of the key code string weight list. If a successful match occurs, the character of the current node is combined with a character combination of the parent node carrying a tag into a character combination carrying a tag corresponding to the current node, and a weight is updated and saved. If no successful match occurs, a weight is not saved.

The candidate ranking determination module 304 is configured to, based on the weights of the character combinations, determine ranking of candidates corresponding to the character combinations. Optionally, the candidate ranking determination module 304 may include a weight adjustment sub-module 3041, an extra-input-tagged character combination weight adjustment sub-module 3042, and a character combination ranking sub-module 3043.

The weight adjustment sub-module 3041 is configured to, if a character combination carrying a key-missing process tag exists among the character combinations, adjust a weight of the character combination carrying the key-missing process tag according to a first preset rule. The extra-input-tagged character combination weight adjustment sub-module 3042 is configured to, if a character combination carrying an extra-input process tag exists among the character combinations, adjust a weight of the character combination carrying the extra-input process tag according to a second first preset rule. The character combination ranking sub-module 3043 is configured to, based on weights of character combinations carrying no tag and/or adjusted weights of character combinations carrying the key-missing process tag and/or adjusted weights of character combinations carrying the extra-input tag, determine the ranking of the candidates corresponding to the character combinations.

Optionally, the character combination ranking sub-module 3043 may include: a comprehensive weight calculation unit 30431 and a candidate ranking unit 30432. The comprehensive weight calculation unit 30431 is configured to, according to the weights of the character combinations carrying no tag, and/or the adjusted weights of the character combinations carrying the key-missing process tag, and/or the adjusted weights of the character combinations carrying the extra-input process tag, intrinsic frequency of the character combinations, usage frequency of the character combinations, time periods from the time the character combinations are lastly used to the current moment, and multi-element relationships between character combinations and previously entered words, calculate a comprehensive weight for each of the character combinations. The candidate ranking unit 30432 is configured to, based on the comprehensive weights of the character combinations, rank the candidates corresponding to the character combinations.

In the embodiment of the present disclosure, an initial key code string inputted by a user in an input method is received, and for each character in the initial key code string, a weight of the character and weights of characters surrounding the character are obtained. Further, a key code string weight list with a corresponding hierarchy is established according to a character input order. When character combinations are obtained from a dictionary, according to a correspondence relationship between a hierarchy in the input method dictionary and a hierarchy in the key code string weight list, weights of the character combinations are determined using the key code string weight list. Based on the weights of the character combinations and a plurality of features with respect to the candidate character combinations, the weights are further processed, and ranking of candidates corresponding to the character combinations is determined based on the processed weight values.

As such, embodiments of the present disclosure can solve the issue of erroneous candidate input caused by frequent touch of a user's finger on keys surrounding the target key when the user inputs literal information using a virtual keyboard displayed on a mobile terminal. Accordingly, the error-correcting capability of the user in key code input may be improved, and the accuracy of the candidates of the input method may be increased.

The device embodiments are basically similar to the method embodiments, such that the related descriptions are relatively simple, and the related descriptions may refer to certain illustrations of the method embodiments.

The embodiments of the present disclosure are described in a progressive manner. Each embodiment highlights its difference from other embodiments, and the same or similar portions between different embodiments may refer to each other.

It should be understood by those skilled in the art that embodiments of the present application may be provided as a method, a device, or a computer program product. Thus, embodiments of the present application may be implemented in the form of hardware implementation, software implementation, or a combination of software implementation and hardware implementation. Moreover, embodiments of the present application may be realized in the form of a computer program product implemented on one or more computer readable storage medium (including but not limited to magnetic disk storage, CD-ROM, optical memory, etc.) comprising computer readable program codes.

In a typical configuration, the computer device includes one or more processors (CPUs), input/output interfaces, network interfaces, and a memory. The memory may include a computer readable medium, for example, a non-permanent memory, a random access memory (RAM), and/or a non-volatile memory such as read-only memory (ROM) or flash memory. Memory is an example of the computer readable medium. The computer readable medium includes both permanent and non-permanent media, and portable and non-portable media may be implemented by any method or technology to realize information storage. The information may be computer readable instructions, data structures, program modules or other data.

Examples of computer storage media include but are not limited to, a phase random-access memory (PRAM), a static random access memory (SRAM), a dynamic random access memory (DRAM), other types of random access memory (RAM), a read only memory (ROM), an electrically erasable programmable read-only memory (EEPROM), a flash memory or other memory technology, a compact disc-read only memory (CD-ROM), a digital versatile disc (DVD), other optical storage devices, a cassette magnetic tape, a magnetic tape storage device, other magnetic storage devices, or any other non-transmission medium that can be used to store information accessed by a computing device. As defined herein, the computer readable medium does not include transitory computer-readable media, such as modulated data signals and carrier waves.

The embodiments of the present disclosure are described with reference to a flowchart and/or a block diagram of a method, a terminal device (system), and a computer program product according to embodiments of the present application. It shall be understood that each process and/or block in the flowchart and/or the block diagram, and combinations of processes and/or blocks in flowcharts and/or block diagrams may be implemented by computer program instructions. These computer program instructions may be provided to a general purpose computer, a special-purpose computer, an embedded processor, or processors of other programmable data processing terminal device to generate a machine. Accordingly, through instructions executed by a processor of a computer or other programmable data processing terminal device, a device with functions specified in one or more processes in a flowchart and/or one or more blocks in a block diagram may be realized.

The computer program instructions may also be stored in a computer readable memory capable of instructing a computer or other programmable data processing terminal device to work in a particular manner. Thus, instructions stored in the computer readable memory produce an article comprising an instruction device, and the instruction device implements the functions specified in one or more processes in a flowchart and/or one or more blocks in a block diagram. The computer program instructions may also be loaded onto a computer or other programmable data processing apparatus to allow a series of operational steps to be performed on the computer or other programmable terminal apparatus to produce a computer implementable process. Accordingly, the instructions executed on the compute or other programmable terminal apparatus may provide steps for implementing functions specified in one or more processes in a flowchart and/or one or more blocks in a block diagram.

Though preferred embodiments of the present disclosure have been described, those skilled in the relevant art will be able to make further changes and modifications to such embodiments upon understanding of the basic inventive concepts. Accordingly, the appended claims can be construed as including the preferred embodiments and all changes and modifications that fall within the scope of the embodiments of the present disclosure.

Finally, it should be noted that, in this paper, relational terms such as first and second are used herein only to distinguish an entity or an operation from another entity or another operation without necessarily requiring or implying that an actual relation or a certain order exists between these entities or operations. Moreover, the term "include", "comprise" or any other variant thereof is intended to encompass non-exclusive inclusion such that a process, method, article of manufacture, or terminal device that includes not only those elements, but also other elements not listed explicitly, or elements intrinsic to the process, method, article of manufacture, or terminal device. In the absence of more restrictions, the elements defined by the statement "including a . . . " do not preclude the presence of additional elements in the process, method, article of manufacture, or terminal device that includes the aforementioned elements.

The foregoing provides detailed illustrations of a method for ranking candidates in an input method and a system for ranking candidates in an input method. Specific examples are used in this paper to explain the principles and implementation, and the above descriptions of embodiments are only intended to facilitate the understanding of the method and the spirit of the present disclosure. Meanwhile, for those skilled in the art, various changes can be made to the specific implementation and the application scope based on the teachings of the present disclosure. The contents of this specification shall not be construed as limiting of the present disclosure.

What is claimed is:

1. A method for ranking candidates in an input method, implemented in a system including an input interface, a memory, and a processor coupled to the input interface and the memory, comprising:

receiving, through the input interface, an initial key code string using the input method;

for each of characters in the initial key code string, obtaining, by the processor, a weight of each of the characters in the initial key code string and weights of surrounding characters according to distances of each of the characters to the initial key code string, and establishing, by the processor, a hierarchical key code string weight list comprising the characters in the initial key code string and the corresponding surrounding characters with the weights thereof, arranged in a hierarchical structure, the hierarchical structure being determined based on a character input order of the characters in the initial key code string and the weights with the key code string in a shortest distance having a full value, the key code string in a second shortest distance having 0.9 of the full value, and the key code string in a third shortest distance having 0.8 of the full value;

saving, in the memory, candidate characters in a first level of character nodes of a dictionary as root nodes, the candidate characters matching a first character in the initial key code string and surrounding characters of the first character;

for each root node, calculating, by the processor, weights of character combinations obtained from a dictionary, including:

for character nodes in an N-th level of the dictionary, reading, by the processor, previous character combinations corresponding to a parent node of a current node and previous weights each corresponding to one of the previous character combinations, N being an integer greater than one;

matching, by the processor, a character of the current node with characters in an N-th level of the hierarchical key code string weight list;

in response to a match, combining, by the processor, the character of the current node with the previous character combinations to form character combinations corresponding to the current node, adding, by the processor, a weight of the character of the current node of the full value to the previous weights to form weights corresponding to the character combinations, and saving, in the memory, the character combinations corresponding to the current node and the weights corresponding to the character combinations;

in response to no match, determining, by the processor, character combinations corresponding to the current node and weights corresponding to the character combinations according to types of the character combinations corresponding to the parent node, comprises:

for the character combination carrying no tag, combining the character of the current node with a character combination carrying no tag of the parent node into a character combination corresponding to the character combination carrying no tag of the current node, and updating and saving a weight of 0.9 or less of the full value;

matching characters of sub-nodes of the current node with the characters in the N-th level of the hierarchical key code string weight list; in response to a match, combining the character of the current node with the character combination carrying no tag of the parent node into a character combination corresponding to a character combination of the current node with a key-missing process tag, and updating and saving a weight of the full value; and in response to no match, saving no weight;

matching the character of the current node with characters in a (N+1)-th level of the hierarchical key code string weight list; in response to a match, combining the character of the current node with the character combination carrying no tag of the parent node into a character combination corresponding to a character combination of the current node with an extra-input process tag, and updating and saving a weight of the full value; and in response to no match, saving no weight;

for a character combination carrying a tag, matching the characters of sub-nodes of the current node with the characters in the N-th level of the hierarchical key code string weight list; in response to a match, combining the character of the current node and a character combination carrying a tag of the parent node into a character combination carrying a tag corresponding to the current node, and updating and saving a weight of 0.9 of the full value; and in response to no match, saving no weight; and based on the weights of the character combinations, ranking, by the processor, candidates corresponding to the character combinations; and further in response to a weight associated with any one of the character combinations corresponding to the parent node being equal to a weight associated with another one of the character combinations, determining the weight of an extended character combination is 0.9 of the weight of the character combinations.

2. The method according to claim 1, wherein, for each of the characters in the initial key code string, obtaining the weight of each of the characters in the initial key code string and the weights of the surrounding characters of each of the characters in the initial key code string, and establishing the hierarchical key code string weight list, comprises:

recording touch-point coordinates of touch points on the input interface in response to an input of the initial key code string;

for each of the touch-point coordinates, determining a key associated with the touch-point coordinate and keys surrounding the key;

calculating first distances between the key associated with the touch-point coordinate and the keys surrounding the key; and according to the first distances of the keys, determining a weight of a key value of the key associated with the touch-point coordinate and weights of key values of the keys surrounding the key, and establishing the hierarchical key code string weight list based on the character input order of characters in the initial key code string.

3. The method according to claim 1, wherein, based on the weights of the character combinations, ranking the candidates corresponding to the character combinations, comprises:

in response to determining a character combination carrying a key-missing process tag among the character combinations, adjusting a weight of the character combination carrying the key-missing process tag according to a first preset rule;

in response to determining a character combination carrying an extra-input process tag among the character combinations, adjusting a weight of the character combination carrying the extra-input process tag according to a second first preset rule;

based on at least one of weights of character combinations carrying no tag, adjusted weights of character combinations carrying the key-missing process tag, or adjusted weights of character combinations carrying the extra-input tag, ranking the candidates corresponding to the character combinations.

4. The method according to claim 3, wherein based on the at least one of the weights of character combinations carrying no tag, the adjusted weights of character combinations carrying the key-missing process tag, or the adjusted weights of character combinations carrying the extra-input tag, ranking the candidates corresponding to the character combinations, comprises:

according to the at least one of the weights of the character combinations carrying no tag, the adjusted weights of the character combinations carrying the key-missing process tag, or the adjusted weights of the character combinations carrying the extra-input process tag, and criteria including frequencies of the character combinations, usage frequencies of the character combinations, time periods from a moment the character combinations are lastly used to a current moment, and multi-element relationships between the character combinations and previously inputted words, calculating a comprehensive weight for each of the character combinations; and based on comprehensive weights of the character combinations, ranking the candidates corresponding to the character combinations.

5. A system for ranking candidates in an input method, comprising an input interface, a memory, and a processor coupled to the input interface and the memory, wherein:

the input interface is configured to receive an initial key code string using the input method;

the processor is configured to:

for each of characters in the initial key code string, obtain a weight of each of the characters in the initial key code string and weights of surrounding characters according to distances of each of the characters to the initial key code string, and establish a hierarchical key code string weight list comprising the characters in the initial key code string and the corresponding surrounding characters with the weights thereof, arranged in a hierarchical structure, the hierarchical structure being determined based on a character input order of the characters in the initial key code string and the weights, with the key code string in a shortest distance having a full value, the key code string in a second shortest distance having 0.9 of the full value, and the key code string in a third shortest distance having 0.8 of the full value;

save, in the memory, candidate characters in a first level of character nodes of a dictionary as root nodes, the candidate characters matching a first character in the initial key code string and surrounding characters of the first character;

for each root node, calculate weights of character combinations obtained from a dictionary, including:

for character nodes in an N-th level of the dictionary, read previous character combinations corresponding to a parent node of a current node and previous weights each corresponding to one of the previous character combinations, N being an integer greater than one;

match a character of the current node with characters in an N-th level of the hierarchical key code string weight list;

in response to a match, combine the character of the current node with the previous character combinations to form character combinations corresponding to the current node, add a weight of the character of the current node of the full value to the previous weights to form weights corresponding to the character combinations, and save, in the memory, the character combinations corresponding to the current node and the weights corresponding to the character combinations;

in response to no match, determine character combinations corresponding to the current node and weights corresponding to the character combinations according to types of the character combinations corresponding to the parent node by the following:

for the character combination carrying no tag, combining the character of the current node with a character combination carrying no tag of the parent node into a character combination corresponding to the character combination carrying no tag of the current node, and updating and saving a weight of 0.9 or less of the full value;

matching characters of sub-nodes of the current node with the characters in the N-th level of the hierarchical key code string weight list; in response to a match, combining the character of the current node with the character combination carrying no tag of the parent node into a character combination corresponding to a character combination of the current node with a key-missing process tag, and updating and saving a weight of the full value; and in response to no match, saving no weight;

matching the character of the current node with characters in a (N+1)-th level of the hierarchical key code string weight list; in response to a match, combining the character of the current node with the character combination carrying no tag of the parent node into a character combination corresponding to a character combination of the current node with an extra-input process tag, and updating and saving a weight of the full value; and in response to no match, saving no weight;

for a character combination carrying a tag, matching the characters of sub-nodes of the current node with the characters in the N-th level of the hierarchical key code string weight list; in response to a match, combining the character of the current node and a character combination carrying a tag of the parent node into a character combination carrying a tag corresponding to the current node, and updating and saving a weight of 0.9 of the full value; and in response to no match, saving no weight;

based on the weights of the character combinations, ranking candidates corresponding to the character combinations; and further in response to a weight associated with any one of the character combinations corresponding to the parent node being equal to a weight associated with another one of the character combinations, determining the weight of an extended character combination is 0.9 of the weight of the character combinations.

6. The system according to claim 5, wherein the processor is further configured to:

record touch point coordinates of touch points on the input interface in response to an input of the initial key code string;

for each of the touch point coordinates, determine a key associated with the touch point coordinate and keys surrounding the key;

calculate first distances between the key associated with the touch point coordinate and the keys surrounding the key; and according to the first distances of the keys, determine a weight of a key value of the key associated with the touch point coordinate and weights of key values of the keys surrounding the key, and establish the hierarchical key code string weight list according to the character input order of characters in the initial key code string.

7. The system according to claim 5, wherein the processor is further configured to:

in response to determining a character combination carrying a key-missing process tag among the character combinations, adjust a weight of the character combination carrying the key-missing process tag according to a first preset rule;

in responses to determining a character combination carrying an extra-input process tag among the character combinations, adjust a weight of the character combination carrying the extra-input process tag according to a second first preset rule; and based on at least one of weights of character combinations carrying no tag, adjusted weights of character combinations carrying the key-missing process tag, or adjusted weights of character combinations carrying the extra-input tag, ranking the candidates corresponding to the character combinations.

8. The system according to claim 7, wherein the processor is further configured to:

according to the at least one of the weights of the character combinations carrying no tag, the adjusted weights of the character combinations carrying the key-missing process tag, or the adjusted weights of the character combinations carrying the extra-input process tag, and criteria including frequencies of the character combinations, usage frequencies of the character combinations, time periods from the time when the character combinations are last used to the current time point, and multi-element relationships between character combinations and previously inputted words, calculate a comprehensive weight for each of the character combinations; and based on the comprehensive weights of the character combinations, rank the candidates corresponding to the character combinations.

\* \* \* \* \*